United States Patent
Scheidt et al.

(10) Patent No.: US 8,084,709 B2
(45) Date of Patent: Dec. 27, 2011

(54) LASER DEVICE WITH PENDULUM-TYPE PRESSURE ROLLER

(75) Inventors: Michael Scheidt, Wetzikon (CH); Oliver Hinz, Sachseln (CH); Daniel Vogler, Lucerne (CH); Adolf Niederberger, Kägiswil (CH)

(73) Assignee: LEISTER Process Technologies, Kägiswil (CH)

( * ) Notice: Subject to any disclaimer, the term of this patent is extended or adjusted under 35 U.S.C. 154(b) by 478 days.

(21) Appl. No.: 12/435,476

(22) Filed: May 5, 2009

(65) Prior Publication Data

US 2009/0277886 A1 Nov. 12, 2009

(30) Foreign Application Priority Data

May 6, 2008 (DE) ..................... 20 2008 006 180 U

(51) Int. Cl.
*B23K 26/20* (2006.01)
(52) U.S. Cl. .............................. 219/121.63; 219/121.75
(58) Field of Classification Search ............. 219/121.63, 219/121.65, 121.75
See application file for complete search history.

(56) References Cited

U.S. PATENT DOCUMENTS 7,211,166 B2    5/2007   Chen et al.

FOREIGN PATENT DOCUMENTS

| DE | 4319742 A1 | * | 12/1994 |
| EP | 1 405 713 | | 4/2004 |
| JP | 58163587 A | * | 9/1983 |
| JP | 2005081396 A | * | 3/2005 |

* cited by examiner

*Primary Examiner* — Samuel M Heinrich
(74) *Attorney, Agent, or Firm* — Renner, Otto, Boisselle & Sklar, LLP

(57) ABSTRACT

The invention concerns a laser device for joining work pieces made of plastic by means of beam welding technology, with a processing head that has focusing devices for the laser beam. Here, the focusing device that is closest to the work pieces has a rotatably supported cylinder lens in the shape of a roller that focuses the laser beam along a single axis and presses the work pieces together in the form of a line in an area around the impact point of the laser beam. In order to enable the cylinder lens to always contact the surface of the work piece facing the processing head in a precisely tangential manner, the processing head has a pendulum-type suspension for the rotatable cylinder lens. This also makes it possible for the contact pressure exerted by the processing head to always act perpendicularly on the work pieces so that they are pressed together in all welding places in the same way in a defined manner during the welding process.

5 Claims, 2 Drawing Sheets

LASER DEVICE WITH PENDULUM-TYPE PRESSURE ROLLER

CROSS-REFERENCE TO RELATED APPLICATION

The present application claims priority under 35 USC §119 to German Patent Application No. 20 2008 006 180.6, filed on May 6, 2008, the entire disclosure of which is incorporated herein by reference.

1. Technical Field of the Invention

The invention concerns a laser device for joining work pieces made of plastic by means of beam welding technology, with a processing head that has focusing devices for the laser beam. Here, the focusing device that is closest to the work pieces has a rotatably supported cylinder lens in the shape of a roller that focuses the laser beam along a single axis and presses the work pieces together in form of a line in an area around the impact point of the laser beam.

2. Description of the Related Art

In beam welding technology, adjacent contact surfaces of the work pieces to be joined are melted by the effect of a laser beam and are joined together under pressure during the subsequent cooling phase. This method of plastic welding by means of a laser beam is commonly known. In this welding process, it is important that the work pieces are clamped to each other during the welding process because not just the energy dosage but also the direct mechanical contact between the surfaces to be joined is an important prerequisite for a good welding joint. In the field, laser devices of many different designs are known.

With three-dimensional welding contours in particular, the clamping of the work pieces with conventional clamping devices requires considerable efforts if sufficient contact pressure is to be exerted on the work pieces over the entire welding contour at the same time. Prior art provides for a robot-controlled processing head to simultaneously guide the laser beam to the spot to be joined and to press the work pieces together mechanically.

EP 1 405 713 B1 discloses a laser device where the work pieces are pressed together either point-by-point at the precise spot where the laser beam impacts or also over a wider area in a region around the impact spot of the beam or along a line perpendicular to the relative movement of the laser beam. This offers the possibility for applying the required clamping force simultaneous with the laser beam along a programmable welding contour in a continuous but always point-by-point process along a line or in a certain area to the very spot at which the welding process is taking place and where the clamping force is actually needed. This is made possible by a processing head that can be moved in three dimensions, that can be moved at an even distance from the work pieces, and that assumes the transmission of a mechanical contact pressure as well as of the laser energy.

The relative motion between the processing head and the work pieces to be welded together is always carried out under mechanical contact while the work pieces are being pressed together at the impact point of the laser beam, among other methods preferably by a roller that is transparent for infrared radiation. The pressure roller, made of glass or plastic for example, is part of the focusing device of the processing head for the laser beam. Thus, it has the optical characteristics of a cylinder lens that focuses the beam in the form of a line along a single axis onto the contact surfaces of the work pieces. The cylinder lens acting as a pressure roller is rotatably attached to the processing head in order to prevent unnecessary mechanical friction. When following the welding contour, the cylinder lens is moved with a rolling motion over the surface of the work pieces in the course of which the laser beam can impact as a line on the work pieces in the forward feeding direction or perpendicular to the forward feeding direction.

In the known laser device, the cylinder lens pressing the work pieces together is centrically rotatably supported at both face surfaces, with the position of the lens relative to the processing head being unchangeable. In relation to the longitudinal axis of the processing head, and therefore also in relation to the optical axis of the focusing devices, the center axis of the cylinder lens is fixed, preferably forming an angle of 90 degrees therewith. In order for the contact pressure as well as the laser radiation to have an optimal effect on the work pieces, it is necessary to guide the processing head at a given speed along the welding contour while always providing for its perpendicular alignment relative to the spot that is being welded. For this purpose, the movement of the processing head is precisely controlled by a robot system that determines the speed of motion, the path of the motion, and the alignment of the head relative to the work pieces in accordance with a programmed specification. In case of slightly deformed three-dimensional work pieces, or in case of minor uneven areas on the work pieces, the programmed attitude of the processing head and therefore of the cylinder lens providing pressure may deviate from its ideal position relative to the work pieces, thereby reducing the quality of the resulting welding seam.

With reference to this prior art, the invention addresses the problem of proposing a solution that would ensure a uniform contact pressure on the work pieces at all times.

SUMMARY OF THE INVENTION

According to the invention, the processing head has a pendulum-type suspension for the rotatable cylinder lens. This enables the cylinder lens to always contact the surface of the work piece facing the processing head in a precisely tangential manner. Thereby, the contact pressure exerted by the processing head always acts perpendicularly on the work pieces so that they are pressed together in all places in the same way in a defined manner.

If the attitude of the processing head is not absolutely perpendicular in relation to the work pieces, the cylinder lens is automatically pivoted around its center as soon as it contacts the work pieces. This enables the cylinder lens to automatically alter its alignment relative to the processing head, with the nature of the connection permitting no movement of the virtual axis of rotation of the cylinder lens in the direction of motion of the processing head, but allowing only an alignment in the direction of the longitudinal axis of the processing head. Thus, the cylinder lens can only tilt around an axis that is perpendicular to the direction of motion of the processing head.

Preferably, the type of the connection is selected so that the axis of tilt of the pendulum-type suspension passes through the center of the cylinder lens. As a result, the laser beam passes through the cylinder lens always centrically, even if the cylinder lens tilts, so that the focus line generated by a tilted lens on the work pieces is also not changed significantly.

In a preferred embodiment of the invention, the cylinder lens acting as a pressure roller is connected to the processing head by means of a universal joint. This is accomplished by attaching a central cross element at two opposite ends with rotatable joints to the processing head and to the cylinder lens.

Technically, this type of Cardanic suspension can be implemented by means of a metal ring that, on the one hand, is tiltably connected to the processing head via two first axles extending in the direction of motion of the processing head and, on the other hand, is connected to the cylinder lens via two additional second axles. The cylinder lens is located in the cavity enclosed by the metal ring, with the second axles extending perpendicular to the direction of motion of the processing head. The second axles that support the cylinder lens in an axially rotatable manner are offset by 90 degrees relative to the first axles.

In a practical variant of the invention, the cylinder lens is connected to the pendulum-type suspension at only one face surface. This makes it possible to guide the cylinder lens closer to edges or corners of work pieces, thereby simplifying the welding process in such places. In the embodiment described above, this can be accomplished in simple fashion by using a ring segment instead of a full metallic ring, with the ring segment extending over a segment angle of 270 degrees and determining a typical gap of 90 degrees. Here, the gap of the ring segment is diametrically opposed to the side of the cylinder lens that is connected to the ring segment.

Below, the invention is explained in detail with reference to an embodiment shown in the drawing. Additional characteristics of the invention may result from the following description of the embodiment of the invention in conjunction with the claims and the attached drawing. The individual characteristics may be implemented either independently or in combinations of several in different embodiments of the invention.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
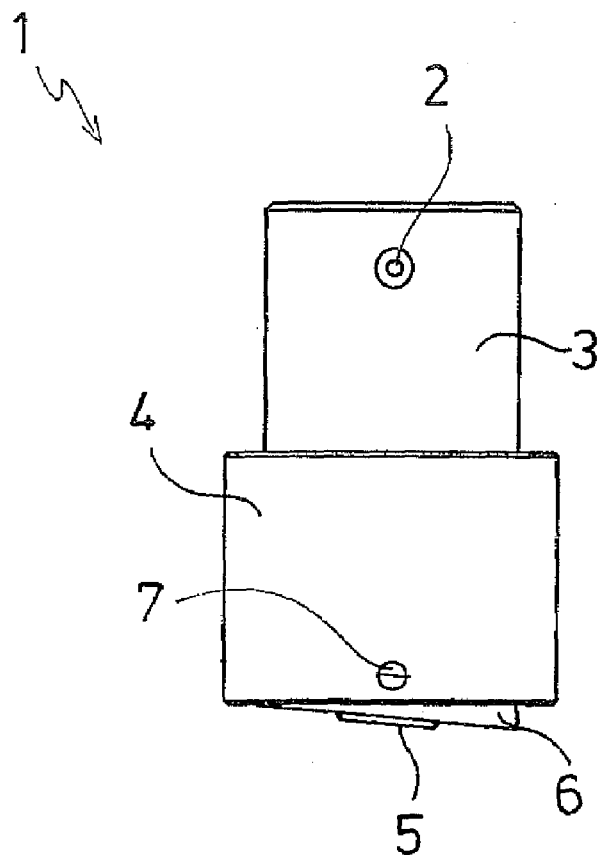
FIG. 1 shows a side view of a holding tube of the processing head of a laser device according to the invention for a cylinder lens that presses the work pieces together and focuses the laser beam.

FIG. 1 shows a holding tube 1 of a processing head (not shown in the drawing) of a laser device according to the invention. The holding tube 1 has the form of a stepped hollow cylinder and can be attached non-permanently by means of an attachment device 2 to the processing head after it is inserted with an upper connection section 3 into a cavity of the processing head. In addition, focusing devices are provided in the processing head that shape and guide an entering laser beam arriving from a laser source.

At a lower attachment section 4 of the holding tube 1, said attachment section following directly, with a larger diameter, after the connection section 3, a cylinder lens 5 is connected movably with the holding tube 1 via a receiving ring 6. The holding tube 1 and the receiving ring 6 are made of metal. The cylinder lens 5 is permeable for the laser beam (not shown in the drawing) and consists of glass or a transparent plastic material.

Figure 2:
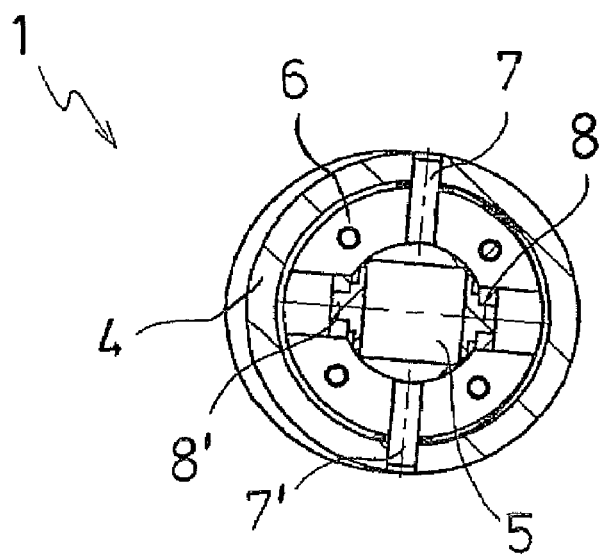
FIG. 2 shows the holding tube from FIG. 1 in a front view, with a view of the cylinder lens.

FIG. 1 and FIG. 2 show the cylinder lens 5 in a tilted position relative to the holding tube 1. In a normal position (not shown in the drawing), the receiving ring 6 and the cylinder lens 5 are aligned perpendicular to the axis of the holding tube 1.

FIG. 2 shows the holding tube 1 according to FIG. 1 in a front view, with a view of the cylinder lens 5. The cylinder lens 5 is mounted in the holding tube 1 with a two-dimensional degree of freedom by means of a Cardanic suspension. The receiving ring 6 is tiltably connected to the holding tube 1 by means of two first axles 7, 7', of which the axle 7 is also visible in FIG. 1. Offset by 90 degrees in relation to the first axles 7, 7', two second axles 8, 8' are provided that rotatably connect the cylinder lens 5 to the receiving ring 6.

The axles 8, 8' are in alignment with the axial center axis 9 of the cylinder lens 5. This allows the cylinder lens 5 to rotate in the direction of motion of the processing head when it is pressed against the work pieces (not shown in the drawing) and when the processing head is moved forward or backward perpendicular to the center axis of the cylinder lens 5.

If, at any location of the welding contour, the processing head with the holding tube 1 is not aligned precisely perpendicular relative to the surface of the work pieces, the receiving ring 6 carrying the cylinder lens 5 automatically aligns itself parallel and/or tangential in relation to the surface of the work pieces due to the contact pressure acting on the cylinder lens 5 asymmetrically to the center 10 of the cylinder lens 5. In doing so, the receiving ring 6 tilts around the axles 7, 7'.

Figure 3:
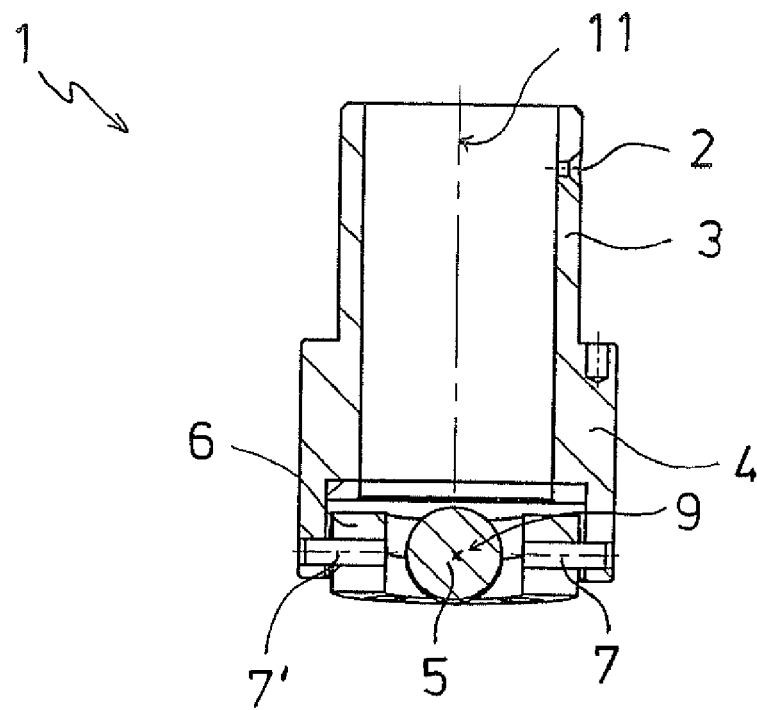
FIG. 3 shows the holding tube from FIG. 1 in a first axial section view, perpendicular to the center axis of the cylinder lens.

FIG. 3 shows the holding tube 1 in a first axial section view where the cylinder lens 5 is sectioned in transverse direction perpendicular to its center axis 9. As in the other figures of the drawing, the receiving ring 6 is tilted around the two axles 7, 7' by several degrees of angle in relation to the holding tube 1. The center axis 9 of the cylinder lens 5 that runs in the longitudinal direction is located in the extension of the central longitudinal axis 11 of the holding tube 1 along which the laser beam (not shown in the figure) also extends. As a consequence, in the normal as well as the tilted position, the laser beam always impacts the cylinder lens 5 in the area of the center plane that is determined by the center axis 9.

Figure 4:
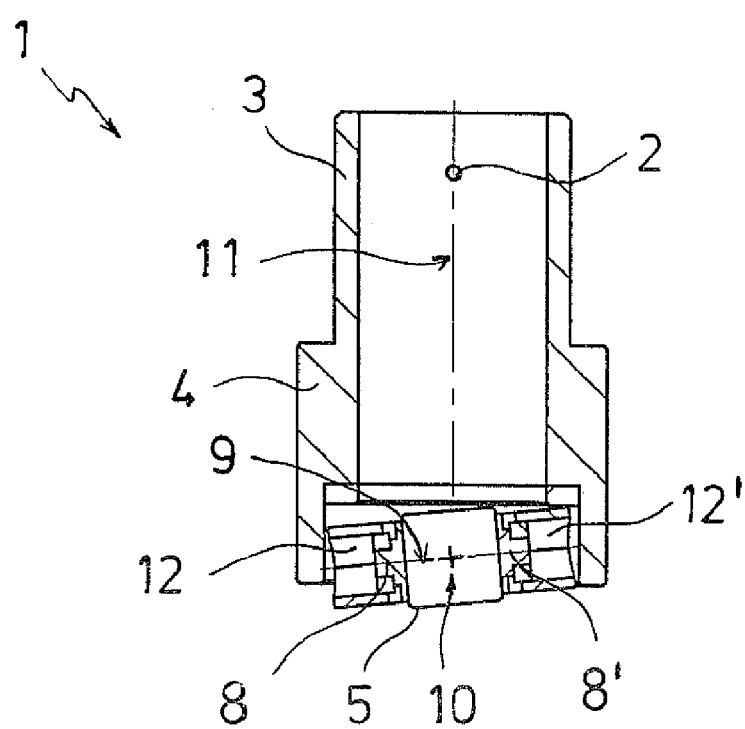
FIG. 4 shows the holding tube from FIG. 1 in a second axial section view, perpendicular to the longitudinal axis of the cylinder lens.

FIG. 4 shows the holding tube 1 in an axial section view that is offset by 90 degrees compared with FIG. 3. The axles 8, 8' for the cylinder lens 5 are held on both sides in friction bearings 12, 12' that are press-fitted into the receiving ring 6. The center 10 of the cylinder lens 5 is located in a direct extension of the longitudinal axis 11 of the holding tube 1 so that the laser beam passes centrally through the cylinder lens 5 regardless of the tilt of the cylinder lens 5 in relation to the holding tube 1. As a consequence, the spatial location of the focus line in relation to the work pieces is only influenced to an insignificant degree by the tilting of the cylinder lens 5.

Further features of the invention can be found in the following description of preferred embodiments of the invention in connection with the claims and the drawings. The single features can be realised alone or several together in embodiments of the invention.

The invention claimed is:

1. A laser device for joining work pieces made of plastic by means of beam welding technology, with a processing head that has focusing devices for the laser beam, where the focusing device that is closest to the work pieces has a rotatably supported cylinder lens in the shape of a roller that focuses the laser beam along a single axis and that presses the work pieces together in the form of a line in an area around the impact point of the laser beam, wherein the processing head has a pendulum-type suspension for the rotatable cylinder lens.

2. A laser device as claimed in claim 1, wherein the axis of tilt of the pendulum-type suspension passes through the center of the cylinder lens.

3. A laser device as claimed in claim 1, wherein the cylinder lens acting as pressure roller is connected to the processing head by means of a universal joint.

4. A laser device as claimed in claim 1, wherein the cylinder lens is connected to the pendulum-type suspension with one face surface only.

5. A laser device as claimed in claim 2, wherein the cylinder lens acting as pressure roller is connected to the processing head by means of a universal joint.

\* \* \* \* \*